K. A. SIMMON & H. T. MORRIS.
CONTROL SYSTEM.
APPLICATION FILED JAN. 31, 1919.
Reissued Mar. 11, 1919. 14,610.
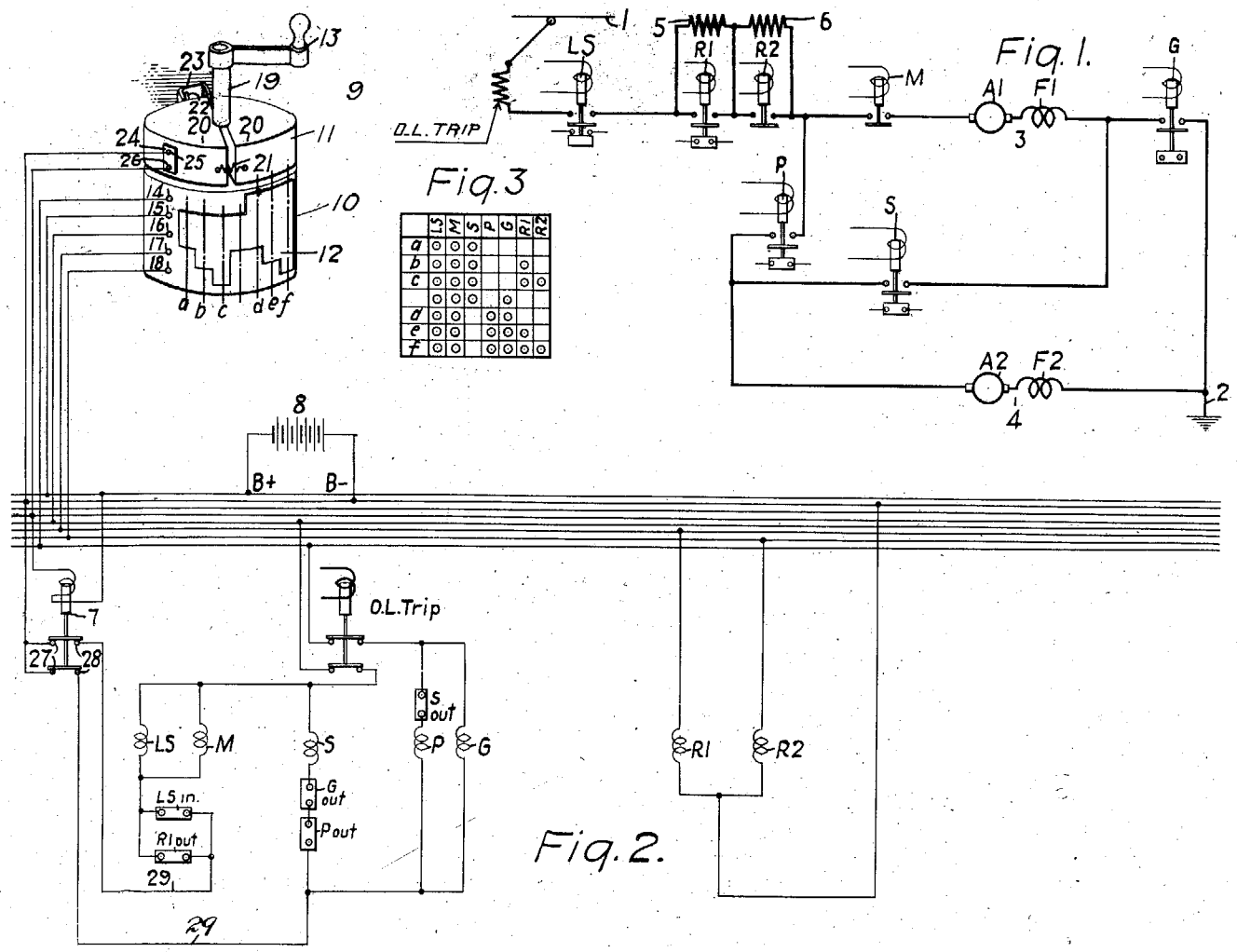
WITNESSES:
R. J. Ridge.
W. C. McCoy.
INVENTORS
Karl A. Simmon &
Hurd T. Morris.
BY
Wesley G. Carr
ATTORNEY

UNITED STATES PATENT OFFICE.

KARL A. SIMMON, OF EDGEWOOD PARK, AND HURD T. MORRIS, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

14,610. Specification of Reissued Letters Patent. Reissued Mar. 11, 1919.

Original No. 1,289,284, dated December 31, 1918, Serial No. 59,833, filed November 5, 1915. Application for reissue filed January 31, 1919. Serial No. 274,375.

*To all whom it may concern:*

Be it known that we, KARL A. SIMMON, a citizen of the United States, and a resident of Edgewood Park, in the county of Allegheny and State of Pennsylvania, and HURD T. MORRIS, a citizen of the United States, and a resident of Wilkinsburg, in the county of Allegheny and State of Pennsylvania, have invented a new and useful Improvement in Control Systems, of which the following is a specification.

Our invention relates to control systems for electric motors and particularly to systems for controlling motors that are adapted for use in electric-railway and similar vehicles.

One object of our invention is to provide a system, of the above-indicated character, wherein the energizing circuit for a plurality of electrically-governed switches shall be positively broken at the instant the master-controller handle is moved a predetermined distance toward the off position.

Another object of our invention is to minimize the burning of the contact members on an auxiliary segment of the controller, as will be hereinafter set forth.

Heretofore, it has been the custom, in control systems embodying a slip-segment controller of a familiar type, to interrupt the energizing circuit for a plurality of electrically-governed switches at the contact members on a frictionally-engaged segment of the controller. It will be observed that the interruption of an inductive circuit will cause an arc to be maintained between the coöperating contact members, and that a positive interruption of the energizing circuit, at the instant the contact members are separated, cannot be made. The arc occasioned by the interruption of this inductive circuit causes burning of the contact members, as will be understood.

According to our invention, we provide a system wherein a frictionally-engaged controller segment is used to complete a circuit instead of to interrupt it. In this manner the energizing circuit of the motor-controlling switches is positively interrupted, through the medium of a suitable relay, at the instant the controller handle is moved a predetermined slight degree toward the off position, and the burning of the contact members on the frictionally-engaged controller segment is minimized.

In the accompanying drawing, Figure 1 is a diagrammatic view of the main motor circuits of a system of control embodying our invention; Fig. 2 is a diagrammatic view of the energizing circuit for the electrically-controlled unit switches that are shown in Fig. 1; and Fig. 3 is a chart, of well-known form, showing the sequence of operation of the unit switches as the controller is moved through its successive forward positions.

Referring to Fig. 1 of the drawing, a supply-circuit conductor 1, receiving energy from any suitable source, (not shown) and a return circuit conductor 2 are adapted to deliver energy to a plurality of electric motors 3 and 4, respectively, having armatures A1 and A2 and field windings F1 and F2, through a line switch LS, a plurality of electrically-governed circuit-arranging switches M, G, P and S and a plurality of electrically-controlled resistance-governing switches R1 and R2 that are adapted to respectively short-circuit resistors 5 and 6.

The several switches R1, R2, M, G, P, S and LS are illustrated as being respectively operated by means of suitable electromagnets or actuating coils that are correspondingly lettered in Fig. 2.

The several electromagnets 7, LS, M, S, P, R1, R2 and G (Fig. 2) are energized from a suitable source, such as a battery 8, through circuits that are arranged and governed by a master controller 9 and by a plurality of interlocking contact members that are respectively marked "LS in", "R1 out", "P out", "G out" and "S out". These interlocking contact members are of a well-known type and are adapted to assume an "in" or an "out" position according to the corresponding positions of their respective switches.

The master controller 9 comprises a main rotatable drum 10 and an auxiliary disk 11. The main drum 10 is provided with a conducting segment 12, a suitable operating handle 13 and an upwardly-projecting cylindrical portion 19 around which the auxiliary disk 11 is disposed. The main conducting segment 12 is adapted to coöperate with a plurality of stationary contact members 14, 15, 16, 17, and 18.

The disk member 11 comprises two similar segments 20 that are resiliently held together by means of suitable springs 21 disposed on opposite sides of the disk member, whereby a frictional engagement between the disk member 11 and the portion 19 of the main drum is effected.

When the disk member 11 is moved in either direction, a projecting member thereon engages the arms of a U-shaped stop 23 to restrict the movement of the disk to an angle that preferably corresponds to a single notch on the controller.

The auxiliary disk 11 is also provided with a conducting segment 24 that is adapted to coöperate with a plurality of stationary contact members 25 and 26. If the main drum 10 of the controller is moved in a forward direction by the handle 13, the frictional engagement between the controller members 11 and 10 will cause the auxiliary disk 11 and the contact bridging member 24, carried thereby, to be moved with the main conducting segment 12 until the movement of the disk 11 is stopped by the engagement of the projecting member 22 with the stop 23, as hereinbefore set forth. In this position, the energizing circuit for the actuating coil of the relay 7 is broken and remains so during further forward movement of the controller handle. If however, the controller handle is moved in a backward direction, the bridging member 24 engages the contact terminals 25 and 26 and thereby establishes a circuit for the actuating coil of the relay 7.

It is therefore seen that the forward movement of the controller handle interrupts the energizing circuit of the relay 7 and thereby establishes the main control circuit by reason of the bridging of the contact members 27 and 28; and that the backward movement of the controller handle establishes the circuit for the relay 7 and thereby interrupts the main control circuit, for reasons to be hereinafter set forth.

It will be understood that, whereas suitable motor-reversing switches and other apparatus are necessary for the successful operation of such a system as we propose, they are not necessary for a complete disclosure of our invention and have, therefore, been omitted from the drawing.

Assuming that the circuit connections are as indicated in the accompanying diagrams, the operation of the system may be set forth as follows: The motors are started by moving the controller handle to the position indicated by the dotted line *a* of Fig. 2. The forward movement of the controller handle causes the relay 7 to bridge the contact members 27 and 28, by reason of the interruption of the energizing circuit for the relay 7 as hereinbefore set forth, and thus establish a main control circuit from the positive terminal B+ of the battery 8 through the contact member 15, conducting segment 12, contact member 16, an overload trip (marked "O. L. trip"), actuating coils of the switches LS, M and S, grouped in parallel relation, interlocks "R1 out", "P out" and "G out", conductors 29 and relay switch members 28 and 27 to the negative terminal B— of the battery 8. It will be noted that, as soon as the switch LS is closed, its interlock is also closed to complete a familiar "holding circuit", and R1 may be closed in the next acceleration step without interrupting the circuit of the switch coil LS.

In order to further accelerate the motors, the master controller drum is moved successively into the other forward positions indicated by the lines *b*, *c*, *d*, *e* and *f*. The switches closed in these several positions may readily be noted from the chart in Fig. 3 and, since these intermediate steps are not pertinent to the invention, a detailed description thereof is not deemed necessary, and the controller drum may be assumed to have been moved into the position *f*.

In the final running position, indicated by the line *f*, the motors are disposed in full-parallel relation, and the switches LS, M, P, G, R1 and R2 are closed. If, from this position, the controller is moved in a backward direction, the conducting segment 24 will engage the contact members 25 and 26 and thus energize the relay 7 and interrupt the main control circuit at the contact members 27 and 28, as hereinbefore set forth. This action causes the switches LS, M, P, G, R2 to automatically open and to remain so until the controller is again moved in a forward direction.

By making the relay 7 quick acting, a positive interruption of the main control circuit, at the instant the contact members 25 and 26 are bridged, is assured. It will be noted that the energizing current for only the relay 7 is interrupted by the controller contact members 25 and 26 and that the main control circuit is interrupted by the contact members of the relay 7. This greatly reduces the burning and consequent wearing away of the auxiliary disk contact members.

We do not wish to be restricted to the specific structural details or to the location and arrangement of control circuits herein set forth, as various modifications thereof may be effected without departing from the spirit and scope of our invention, and we desire, therefore, that only such limitations shall be imposed as are indicated in the appended claims.

We claim as our invention:

1. In a system of control, the combination with a dynamo-electric machine, a plurality of switching devices for governing the operation thereof, controlling means for said switching devices, and an auxiliary circuit associated with said means, of circuit-closing means associated with said controlling means for closing said auxiliary circuit to effect the opening of certain of said switching devices under predetermined operating conditions of said controlling means.

2. In a control system, the combination with an electric motor, a plurality of electrically-controlled switches for governing the operation thereof, a controller for governing the operation of said switches, and an auxiliary control circuit associated with said controller, of circuit-closing means associated with said controller for closing said auxiliary circuit to effect the opening of all of said switches if the controller is moved backwardly a predetermined slight degree.

3. In a control system, the combination with an electric motor, a plurality of electrically-controlled switches for governing the operation thereof, and a controlling means for said switches, of circuit-closing means associated with said controlling means for deënergizing certain of said switches under predetermined operating conditions of said controlling means.

4. In a control system, the combination with an electric motor, a plurality of electrically-controlled switches for governing the operation thereof, a controller for selectively governing the energization of said switches when moved in a forward direction, and an electro-responsive device, of means for completing a circuit through said electro-responsive device when the controller is moved backwardly a predetermined slight degree to deënergize said electrically-controlled switches.

5. In a control system, the combination with an electric motor, a plurality of electrically-controlled switches for governing the operation thereof, and a controller for governing the operation of said switches, of a contact bridging member embodied in said controller for establishing an auxiliary control circuit if the controller is moved backwardly a predetermined slight degree.

6. In a control system, the combination with an electric motor, a plurality of electrically-controlled switches for governing the operation thereof, a controller for said switches, and an auxiliary circuit, of a circuit-closing means associated with said controlling means for closing said auxiliary circuit if said controller is moved a predetermined slight degree toward its off position.

7. In a control system, the combination with a motor, a plurality of electrically-controlled switches for governing the operation thereof, and a controller for governing the operation of said switches, of a circuit-closing means associated with said controller for establishing an auxiliary control circuit to release certain of said electrically-controlled switches if the controller is moved backwardly a predetermined slight degree.

8. In a control system, the combination with an electric motor having main circuits extending therethrough, a plurality of electrically-controlled switches for governing the operation thereof, a controller for governing the operation of said switches, and an auxiliary control circuit associated with said controller, of a circuit-closing means for closing said auxiliary circuit to interrupt the main circuits if the controller is moved backwardly a predetermined relatively slight degree.

9. In a system of control, the combination with an electric motor, a plurality of electrically-controlled switches for governing the operation thereof, a controller for completing the energizing circuits for said switches, and an auxiliary control circuit associated with said controller, of means associated with said controller for maintaining a circuit through said motor during the forward movement of the controller and for closing said auxiliary circuit to interrupt the motor circuit when the controller is moved backwardly a single notch.

10. In a control system, the combination with an electric motor, and a plurality of electrically-controlled switches for governing the operation thereof, of a controller for controlling the operation of said switches and comprising a main contact-bearing member and an auxiliary contact-bearing member, and circuit-closing means associated with said auxiliary contact bearing member for deënergizing certain of said switches if the main drum of the controller is moved backwardly a predetermined slight degree.

11. In a control system, the combination with a motor, a main controller drum for governing the acceleration of said motor, an auxiliary control circuit, and means controlled by said auxiliary circuit for opening the motor circuits, of an auxiliary drum associated with said main controller drum and embodying means for closing said auxiliary control circuit to open the motor circuits if the main controller drum is moved backwardly a predetermined slight amount.

12. In a system of control, the combination with a motor, a plurality of switches for controlling the operation of said motor and a controller for governing the operation of said switches, of an auxiliary electrically-operated switch, and means associated with said controller for energizing said auxiliary switch to release all operated switches when the controller is moved in a reverse direction a predetermined slight degree.

13. In a system of control, the combination with a motor, control means for governing the operation of said motor, a controller for governing the operation of said means, and an electrically-operated switch, of means associated with said controller for operating said switch to release said control means when the controller is moved in a reverse direction a predetermined slight degree.

14. In a system of control, the combination with a motor, a controller for governing the operation of said motor, and an electrically-operated switch, of means associated with said controller for operating said switch to break the motor circuit when the controller is moved in a reverse direction a predetermined slight degree.

In testimony whereof, we have hereunto subscribed our names this 28th day of Oct., 1915.

KARL A. SIMMON.
HURD T. MORRIS.